United States Patent
Xu et al.

(10) Patent No.: US 7,514,806 B2
(45) Date of Patent: Apr. 7, 2009

(54) ENGINE START SYSTEM WITH QUADRATURE AC EXCITATION

(75) Inventors: Mingzhou Xu, Oro Valley, AZ (US); Cristian E. Anghel, Oro Valley, AZ (US); Wayne T. Pearson, Oro Valley, AZ (US)

(73) Assignee: Honeywell International Inc., Morristown, NJ (US)

( * ) Notice: Subject to any disclaimer, the term of this patent is extended or adjusted under 35 U.S.C. 154(b) by 49 days.

(21) Appl. No.: 11/758,189

(22) Filed: Jun. 5, 2007

(65) Prior Publication Data

US 2008/0303280 A1  Dec. 11, 2008

(51) Int. Cl.
 *H02P 7/36* (2006.01)
(52) U.S. Cl. ........................................... 290/31
(58) Field of Classification Search .............. 290/31
 See application file for complete search history.

(56) References Cited

U.S. PATENT DOCUMENTS

| | | | |
|---|---|---|---|
| 3,378,756 A | 4/1968 | Potter | |
| 3,908,161 A | 9/1975 | Messenger | |
| 4,093,869 A | 6/1978 | Hoffmann et al. | |
| 4,219,739 A * | 8/1980 | Greenwell | 290/46 |
| 4,246,531 A | 1/1981 | Jordan | |
| 4,719,378 A | 1/1988 | Katsuma et al. | |
| 5,512,811 A | 4/1996 | Latos et al. | |
| 6,188,204 B1 | 2/2001 | Vithayathil et al. | |
| 6,278,194 B1 * | 8/2001 | Nakagawa et al. | 290/31 |
| 6,768,278 B2 * | 7/2004 | Xu et al. | 318/140 |
| 6,788,031 B2 | 9/2004 | Pendell | |
| 6,809,496 B2 * | 10/2004 | Anghel et al. | 318/700 |
| 6,906,479 B2 * | 6/2005 | Xu et al. | 318/140 |
| 6,909,263 B2 * | 6/2005 | Xu et al. | 322/29 |
| 6,979,979 B2 * | 12/2005 | Xu et al. | 322/59 |
| 6,995,478 B2 * | 2/2006 | Xu et al. | 290/52 |
| 7,045,986 B2 * | 5/2006 | Anghel et al. | 318/712 |
| 7,064,455 B2 | 6/2006 | Lando | |

(Continued)

OTHER PUBLICATIONS

Shiao, Ying Shing; Lin, Chin E. "Prototype Induction Generator VSCF System for Aircraft", International IEEE/IAS Conference on Industrial Automation and Control: Emerging Technologies, Proceedings, 1995, p. 148-155, May 22-27, 1995, Taipei, Taiwan.

(Continued)

*Primary Examiner*—Joseph Waks
(74) *Attorney, Agent, or Firm*—Oral Caglar, Esq.

(57) ABSTRACT

A starter-generator system may be used to supply sufficient starting torque to start an aircraft main engine. The main starter-generator stator winding may be connected to a constant frequency (CF) power source to create a rotating field in the main starter-generator air gap. This rotating field, in turn, may induce current on the main rotor winding, which may be a closed circuit formed by main rotor field winding and exciter armature winding. The interaction between the main rotor current and the air gap flux may give rise to the starting torque to start the main engine. Adjusting the voltage supplied to the exciter stator field winding can modify the induced voltage and current on the rotor circuit to control the rotor current and starting torque. The starter-generator system may also be used to start an aircraft main engine by directly connecting the main stator winding to a power source without powering the exciter stator.

19 Claims, 5 Drawing Sheets

U.S. PATENT DOCUMENTS

| | | | |
|---|---|---|---|
| 7,078,826 B2 * | 7/2006 | Xu et al. | 290/52 |
| 7,088,027 B2 | 8/2006 | Leijon et al. | |
| 7,301,311 B2 * | 11/2007 | Xu et al. | 322/59 |
| 7,327,048 B2 * | 2/2008 | Xu et al. | 290/52 |
| 7,400,056 B2 * | 7/2008 | McGinley et al. | 290/46 |
| 2005/0180862 A1 | 8/2005 | Lando | |
| 2006/0087293 A1 | 4/2006 | Xu et al. | |
| 2006/0192535 A1 | 8/2006 | Lando | |

OTHER PUBLICATIONS

Dishner, Bryan; Morris, Angela, "Novel Electromechanical Approach to Constant Frequency Power Generation", IEEE Proceedings of the National Aerospace and Electronics Conference, v 4, 1989, p. 1765-1769, NAECON 1989, May 22-26, 1989, Dayton, OH.

* cited by examiner

ENGINE START SYSTEM WITH QUADRATURE AC EXCITATION

BACKGROUND OF THE INVENTION

The present invention relates to engine start systems and, more particularly, to engine start systems that may use a readily available constant frequency power source such as an auxiliary power unit (APU) or external ground power.

Using electric, brushless starter-generators for main engine start and for power generation can save aircraft weight and improve operating economics as part of the new more electric architecture (MEA) systems architectures. The starter-generator has to provide high starting torque to start the main engine. Conventional main engine starter-generator systems involve the use of high power inverters to provide a controllable variable frequency power source which adds cost, weight and complexity while decreasing the reliability of the system.

Many aircraft include starter-generator systems to supply relatively constant frequency AC power. Many of the starter-generator systems installed in aircraft include three separate brushless starter-generators, namely, a permanent magnet starter-generator (PMG), an exciter, and a main starter-generator. The PMG includes a rotor having permanent magnets mounted thereon, and a stator having a plurality of windings. When the PMG rotor rotates, the permanent magnets induce AC currents in PMG stator windings. These AC currents are typically fed to a regulator or a control device, which in turn outputs a DC current to the exciter.

The exciter typically includes single-phase (e.g., DC) stator windings and multi-phase (e.g., three-phase) rotor windings. The DC current from the regulator or control device is supplied to exciter stator windings, and as the exciter rotor rotates, three phases of AC current are typically induced in the rotor windings. Rectifier circuits that rotate with the exciter rotor rectify this three-phase AC current, and the resulting DC currents are provided to the main starter-generator. The main starter-generator additionally includes a rotor and a stator having single-phase (e.g., DC) and multi-phase (e.g., three-phase) windings, respectively. The DC currents from the rectifier circuits are supplied to the rotor windings. Thus, as the main starter-generator rotor rotates, three phases of AC current are induced in main starter-generator stator windings. This three-phase AC current can then be provided to a load such as, for example, electrical aircraft systems.

Many of these starter-generator systems are driven by variable speed prime movers. For example, many starter-generators are driven by the aircraft engines, which may vary in rotational speed during operation. Thus, to ensure the AC starter-generators supply relatively constant frequency AC power, many aircraft include a hydro-mechanical transmission, or other type of gear arrangement, that converts the variable engine speed to a relatively constant rotational speed.

Although the above-described configuration is generally safe, hydro-mechanical transmissions can be relatively large, heavy, complex, and/or may exhibit relatively poor reliability. Each of these factors can lead to high overall aircraft, fuel, and maintenance costs, and/or increased maintenance frequency, which can further lead to increased costs.

U.S. Pat. No. 6,188,204 to Vithayathil et al. disclose employing main windings and auxiliary windings disposed on the same rotor. The auxiliary windings are supplied with adjustable frequency AC power, and in turn excite the main windings to produce a desired three phase output frequency. Although this solution does work, the main and auxiliary windings must be arranged to be magnetically decoupled by configuring a specified number of poles, so that the flux generated by the main windings does not induce any voltage in the auxiliary windings that has a different number of poles or vice versa. This can lead to complexity in design and implementation.

U.S. Pat. No. 7,064,455 to Lando employs rotor windings of the exciter and the main starter-generator disposed on the same primary shaft, with a permanent magnet starter-generator (PMG) disposed about an associated secondary shaft, for determining the rotational speed of the primary shaft. The rotors of the exciter and main starter-generator employ three-phase windings. However, this design offers no improvement over the complexity inherent in such three-phase windings.

Both patents mentioned above concern generation mode only and have no provision to be a starter. Hence, it can be seen that there is a need for a system and method of starting a main engine from a starter-generator that is relatively small, lightweight, less complex, and more reliable, as compared to current systems and methods, and that does not rely on specified numbers of exciter and main starter-generator poles.

SUMMARY OF THE INVENTION

In one aspect of the present invention, an engine starting system comprises a main starter-generator having a main starter-generator rotor, the main starter-generator rotor having main starter-generator rotor windings wound thereupon; an exciter having an exciter rotor and an exciter stator, the exciter rotor having exciter rotor windings wound thereon; wherein the exciter rotor is configured to provide two phase excitation current to the main starter-generator rotor windings. These two phase windings on either the exciter rotor, the main generator rotor, or both, may be configured to be shifted by a value chosen from a range of from 80 electrical degrees to 100 electrical degrees in time and space, with a choice of 90 electrical degrees being one exemplary embodiment. The connections between main rotor and exciter rotor windings can be made in the same phase sequence or opposite phase sequence.

In another aspect of the invention, an engine starting system comprises a shaft, wherein sufficient rotation of the shaft starts the engine; a main starter-generator stator with a plurality of main stator windings wound thereon; a main starter-generator rotor mounted on the shaft and disposed at least partially within the main starter-generator stator, the main starter-generator rotor having a plurality of main starter-generator rotor windings wound thereon to generate an air gap flux when they are electrically excited; an exciter rotor mounted on the shaft, the exciter rotor having a plurality of exciter rotor windings wound thereon; an exciter stator surrounding at least a portion of the exciter rotor, the exciter stator having a plurality of exciter stator windings wound thereon; and an exciter controller electrically coupled to the exciter stator windings, the exciter controller configured to provide electrical excitation to the exciter stator windings.

In still another aspect of the invention, an aircraft starter-generator system to start an aircraft gas turbine engine as the prime mover comprises a housing; a drive shaft rotationally mounted within the housing and transmitting power to the prime mover; a main starter-generator stator mounted within the housing and having a plurality of main starter-generator stator windings wound thereon; a main starter-generator rotor mounted on the drive shaft and disposed within the main starter-generator stator, the main starter-generator rotor having a plurality of main starter-generator rotor windings wound thereon configured to receive a two-phase excitation current, wherein the main starter-generator rotor windings generate an air gap flux upon electrical excitation thereof; an exciter rotor mounted on the drive shaft, the exciter rotor having a plurality of exciter rotor windings wound thereon, the exciter rotor windings electrically connected to the main starter-generator rotor; an exciter stator surrounding the exciter rotor, the exciter stator having a plurality of exciter stator windings wound thereon, the exciter stator windings configured, upon electrical excitation thereof, to electrically excite the exciter rotor windings, wherein interaction between currents in the main starter-generator rotor windings and the main starter-generator stator windings, which can be powered by a readily available constant frequency power source such as APU or external ground power, creates a starting torque to turn the shaft to start the engine, and voltage supplied to the exciter stator winding controls the current in the main starter-generator rotor and the starting torque. It will be also appreciated that the starter-generator described therein can provide starting torque to start an engine by powering the main stator windings only with a constant frequency power source without powering the exciter stator windings.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a system and methods that may use a readily available constant frequency power source, such as the APU or external ground power supply, to start the main engine of an aircraft. These systems and methods, together with intelligent excitation control and novel starter-generator design, may allow for tailoring of the torque-speed profile of the starter-generator. For example, in one embodiment of the present invention, the main starter-generator stator winding may be connected to a constant frequency (CF) power source to create a rotating field in the main starter-generator air gap. This flux, in turn, may induce current on the main rotor winding, which may be a closed circuit formed by main rotor field winding and exciter armature winding. The interaction between the main rotor current and the air gap flux may give rise to the starting torque to start the main engine. The voltage supplied to the exciter stator field winding may be adjusted to modify the induced voltage and current on the rotor circuit to control the rotor current and starting torque. The present invention may be useful to start a main engine of, for example, an aircraft, a ground vehicle, an industrial generator and the like.

A traditional synchronous wound rotor starter-generator typically has a single phase winding on the main rotor that creates a flux field that is locked to the rotor rotation. The present invention may create a rotor winding scheme using two phase windings that are in quadrature with each other and are controlled in a manner that allows the air gap flux to rotate at a speed that is synchronous with the stator power frequency. More specifically, the starter-generator described herein may employ the use of two-phase current to transfer energy from the exciter rotor to the main starter-generator rotor, whereas in the prior art, three-phase current is used between the exciter rotor and the main starter-generator rotor. By using two-phase instead of three-phase power transfer between the rotors, a simple winding scheme for the rotor poles can be used, with the phase windings being in quadrature with each other, which greatly reduces the complexity of the general construction of the starter-generator.

Figure 1:
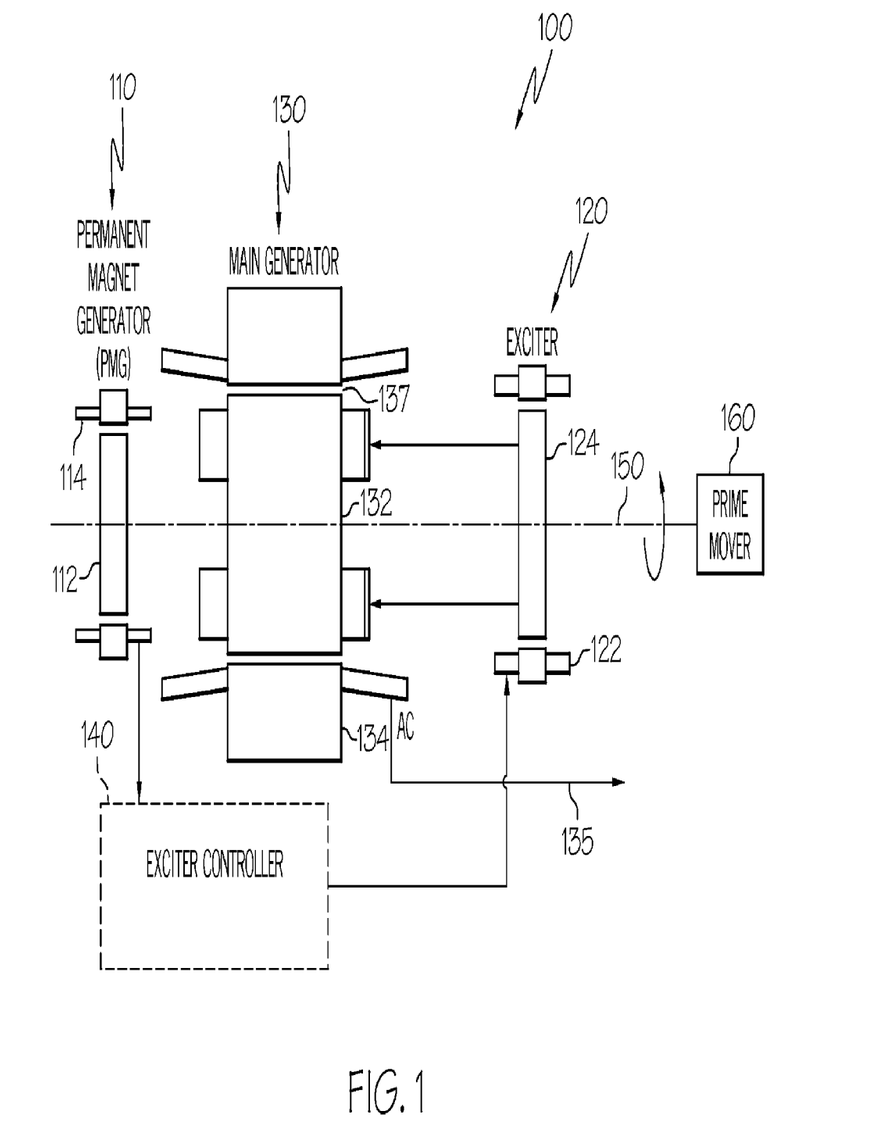
FIG. 1 is a functional block diagram of an exemplary high speed starter-generator system according to an embodiment of the present invention.

Turning now to the description and with reference first to FIG. 1, a functional schematic block diagram of an exemplary high speed starter-generator system 100 for use with, for example, an aircraft gas turbine engine, is shown. This exemplary starter-generator system 100 may include a permanent magnet starter-generator (PMG) 110, an exciter 120, a main starter-generator 130, and an exciter controller 140. It will be appreciated that the starter-generator system 100 may also include one or more additional components, sensors, or controllers. However, a description of these additional components, sensors, and controllers, if included, is not necessary for a description of the invention, and will therefore not be further depicted or described.

In the depicted embodiment, a PMG rotor 112 of the PMG 110, an exciter rotor 124 of the exciter 120, and a main starter-generator rotor 132 of the main starter-generator 130 may be mounted on a common drive shaft 150. The drive shaft 150 may provide a rotational drive force to a prime mover 160, such as an aircraft gas turbine engine, which may cause the PMG rotor 112, the exciter rotor 124, and the main starter-generator rotor 132 to all rotate at the same rotational speed.

By connecting the windings of a main starter-generator stator 134 to a constant frequency (CF) power source (such as an APU or external power, not shown, but connect via a power line), a rotating field in an air gap of the main starter-generator 130 may be created. This air gap flux may induce current on the winding of the main starter-generator rotor 132. Interaction between the current in the winding of the main starter-generator rotor 132 and air gap flux may give rise to the starting torque to start the main engine (not shown) via the prime mover 160.

After engine start, the starter-generator system 100 may operate as a starter-generator. It will be appreciated that as the PMG rotor 112 rotates, the PMG 110 may generate and supply AC power to the exciter controller 140 from a PMG stator 114. In response, the exciter controller 140 may be electrically coupled to an exciter stator 122 of the exciter 120 to supply AC power to the exciter stator 122. In turn, this may induce the exciter rotor 124 to supply an induced alternating current to the main starter-generator rotor 132. As the main starter-generator rotor 132 rotates, it may induce AC current in a main starter-generator stator 134, which may be, in turn, supplied to one or more loads.

Figure 2:
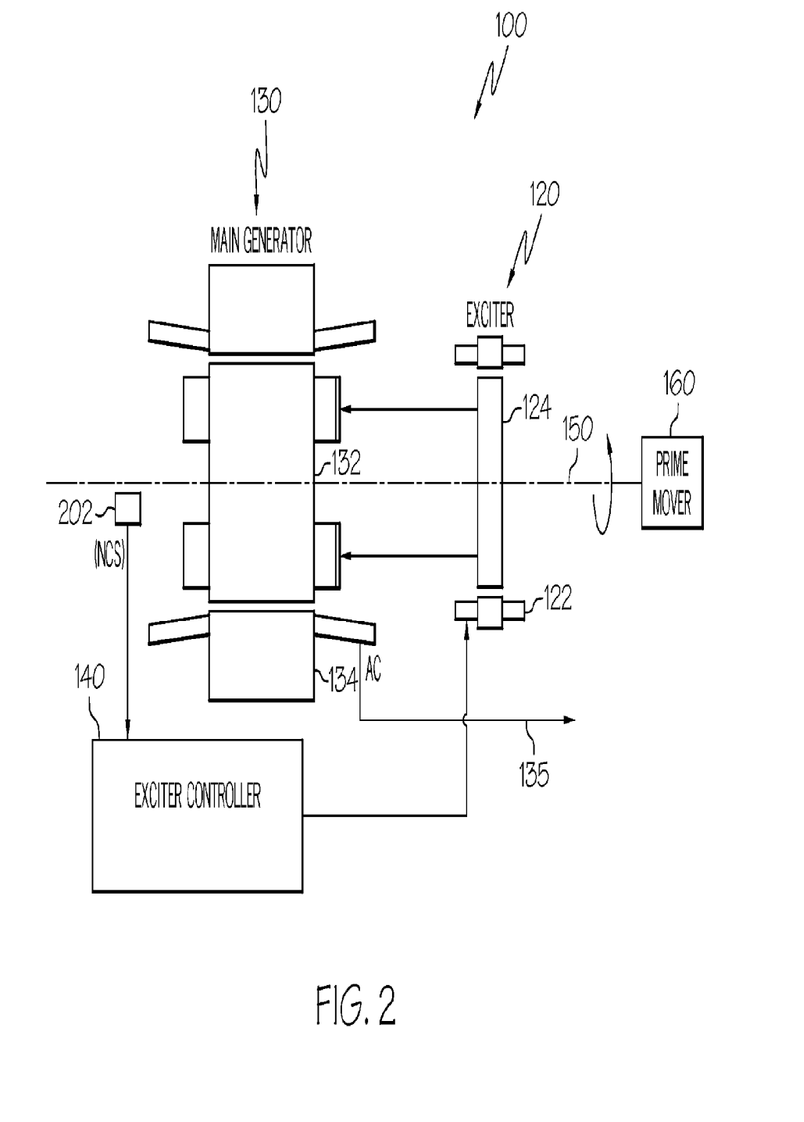
FIG. 2 is a functional block diagram of an exemplary high speed starter-generator system according to an alternative embodiment of the present invention.

Before proceeding further, it will be appreciated that although the starter-generator system 100 described above is implemented with a PMG 110, the starter-generator system 100 could alternatively be implemented with other devices in place of the PMG 110, which respond to the rotational speed of the drive shaft 150. In such an alternative embodiment, as shown in FIG. 2, the starter-generator system 100 may include a speed sensor 202 rather than the PMG 110. The speed sensor 202, which may be implemented using any one of numerous types of rotational speed sensors, may be configured to sense the rotational speed of the drive shaft 150 and supply a speed signal (NCS) representative of the rotational speed of the drive shaft 150 to the exciter controller 140. The exciter controller 140 may use this speed signal NCS to modulate an energy source (not shown) that is independent of the starter-generator system 100, e.g. another generator associated with the prime mover but decoupled from the shaft or a battery-operated generator. Although the exciter controller 140 in this alternative embodiment may also supply AC power to the exciter stator 122, it may do so in response to the speed signal from the speed sensor 202 rather than in response to the AC power supplied from the PMG 110, the frequency of which may be indicative of the rotational speed of drive shaft 150. In yet another embodiment (not shown), the exciter controller 140 may use a frequency signal from main generator stator windings 404 to determine the correct input frequency to the exciter stator windings 406 to achieve the predetermined constant output frequency at the main generator 130. In all embodiments, however, it should be noted that the signal supplied to the exciter controller 140, regardless of whether it is the AC power signal from the PMG 110 or the speed signal from the speed sensor 202, may be representative of shaft rotational speed.

Figure 3:
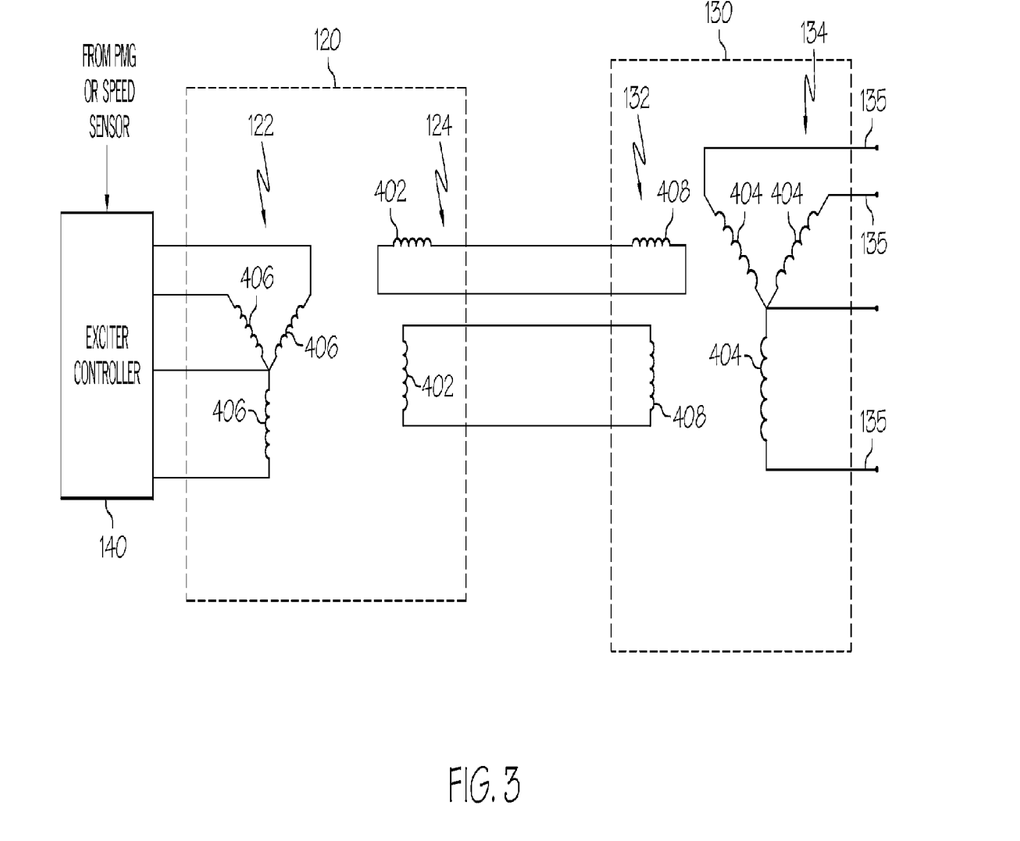
FIG. 3 is a schematic representation of an embodiment of the high speed starter-generators of FIGS. 1 and 2.
Figure 4:
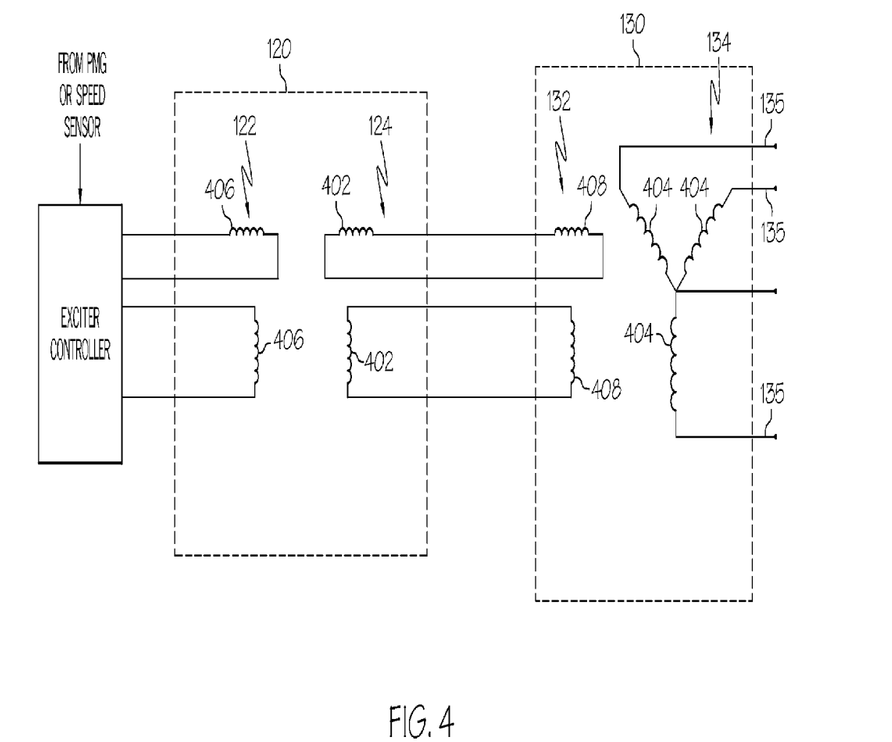
FIG. 4 is a schematic representation of another embodiment of the high speed starter-generators of FIGS. 1 and 2.

Referring now to FIG. 3, it may be seen, for example, that the exciter rotor 124 and the main starter-generator rotor 132 may be configured differently from conventional brushless AC starter-generator systems, and the exciter stator 122 and main starter-generator stator 134 may also be configured differently from conventional brushless AC generator systems. In particular, the exciter rotor 124 and the main starter-generator rotor 132 may be implemented with two phase exciter rotor windings 402 and two phase main rotor windings 408 respectively. These two phase windings may be configured to be shifted by a value in a range of from 80 electrical degrees to 100 electrical degrees in time and in space, with 90 electrical degrees being an exemplary amount (resulting in the phase windings being in quadrature with each other). Conversely, the exciter stator 122 may be implemented with three phase exciter stator windings 406 as shown in FIG. 3 or two phase exciter stator windings 406 as shown in FIG. 4, while the main starter-generator stator 134 may be implemented with standard three phase main stator windings 404. It will be appreciated that core of the exciter stator 122 can be configured to use either slotted cylindrical poles or salient poles. Another difference from conventional brushless AC generator systems may be that there may be no rotating rectifier assemblies coupled between the exciter rotor 124 and the main rotor 132. Rather, the exciter rotor windings 402 may be directly coupled to the main rotor windings 408.

The exciter controller 140 may be implemented, at least in part, as a power converter circuit that is configured, in response to the signal supplied to it from either the PMG 110 or main starter-generator stator windings 404, to supply variable-frequency, three-phase excitation to the exciter stator windings 406, as shown in FIG. 3, with either a relatively positive or negative phase sequence or to supply a DC current in the synchronous operating mode. Alternatively, the exciter controller 140 may be implemented to supply variable frequency, two-phase excitation to the exciter stator windings 406, as shown in FIG. 4. In either case, the exciter rotor windings 402 may be configured to provide two phase excitation current to the main starter-generator rotor windings 408. These two phase windings are shifted by 90 electrical degrees in time and in space. It may be appreciated that relatively negative phase sequence excitation, as used herein, is excitation that is supplied in a direction opposite that which the exciter rotor 124 is rotating, and relatively positive sequence excitation, as used herein, is excitation that is supplied in a direction the same as which the exciter rotor 124 is rotating. It may be also appreciated that the exciter can be operating at three different modes, namely sub synchronous (negative phase sequence), super synchronous (positive phase sequence) and synchronous (DC current).

The excitation frequency and phase sequence that the exciter controller 140 may supply to the exciter stator windings 406 may depend upon the desired torque and rotational speed needed to turn the prime mover 160 in order to augment the main starter-generator stator 134. Alternatively, the exciter controller 140 may supply to the exciter stator windings 406 an excitation frequency and phase sequence to control the starting of the main engine (not shown) and avoid high in-rush current being generated in the main stator windings 404 and power supply units (not shown). In other words, the exciter controller 140 may control the phasing and frequency of the current in the exciter stator 122 to produce the appropriate prime mover 160 starting torque to meet the main engine start torque profile. This may eliminate the requirement for controlled power electronics to be supplied to the main starter-generator stator 134.

Figure 5:
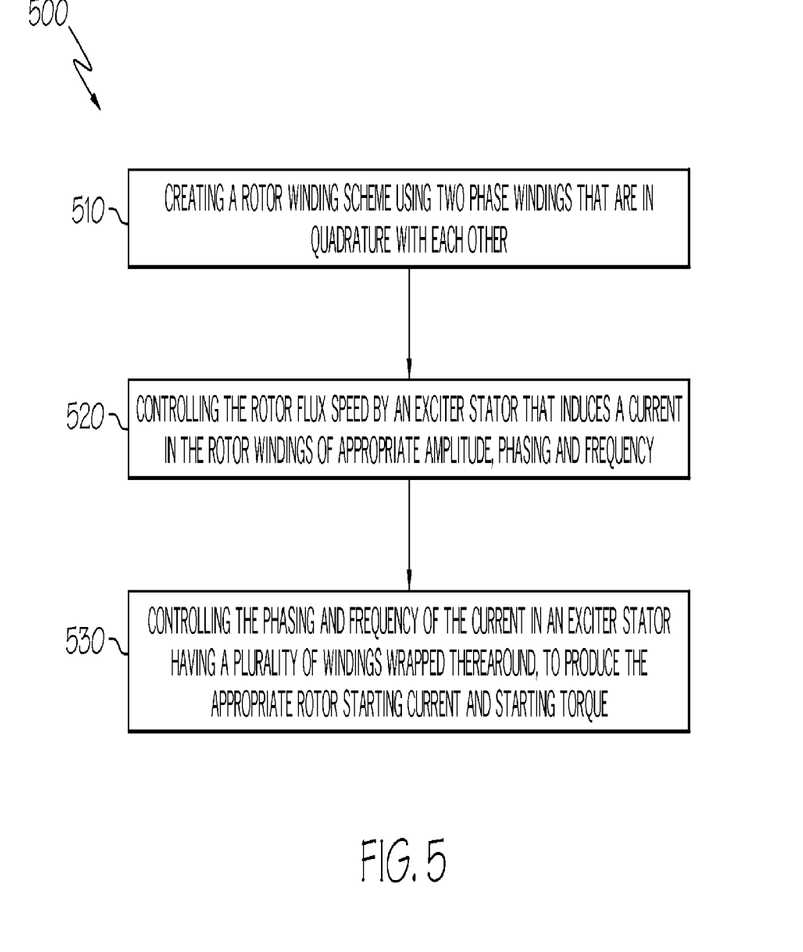
FIG. 5 is a flow chart describing a method according to the present invention.

Referring now to FIG. 5, the present invention may also include a method 500 for starting an aircraft engine. Such a method 500 may include, for example, a step 510 of creating a rotor winding scheme using two phase windings that are in quadrature with each other and are controlled in a manner that allows the air gap flux to rotate at a speed that is synchronous with the stator power frequency. The method may also include a step 520 for controlling the rotor flux speed by an exciter stator that induces a current in the rotor windings of appropriate amplitude, phasing and frequency. Furthermore, the methods of the present invention may also include a step 530 for controlling, with an electronic controller, for example, the phasing and frequency of the current in an exciter stator having a plurality of windings wrapped therearound, to produce the appropriate rotor starting current and starting torque to meet the main engine start torque profile requirements. It may be appreciated that a starter-generator with the configuration described in this invention can also start a main engine or other type of loads by directly connecting its main stator windings 404 to a readily available CF power supply without exciting the exciter stator 122.

It should be understood, of course, that the foregoing relates to exemplary embodiments of the invention and that modifications may be made without departing from the spirit and scope of the invention as set forth in the following claims.

We claim:

1. An engine starting system comprising:
    a main starter-generator having a main starter-generator rotor, the main starter-generator rotor having main starter-generator rotor windings wound thereupon;
    an exciter having an exciter rotor and an exciter stator, the exciter rotor having exciter rotor windings wound thereon;
    wherein the exciter rotor is configured to provide two phase excitation current to the main starter-generator rotor windings.

2. The engine starting system of claim 1, wherein:
    the main starter-generator rotor windings are two phase main starter-generator rotor windings that are in quadrature with each other;

the exciter rotor windings are two phase exciter rotor windings that are in quadrature with each other;

a connection between the main starter-generator rotor windings and the exciter rotor windings is made in an opposite phase sequence or in the same phase sequence.

3. The engine starting system of claim 1, wherein:

the main starter-generator rotor and the exciter rotor are configured to rotate in a first direction at a variable rotational speed;

the electrical excitation supplied to the exciter stator is multi-phase AC or DC excitation having a phase sequence; and an exciter controller supplies the multi-phase AC or DC electrical excitation to a plurality of exciter stator windings in the phase sequence that is in either the first direction or a second direction opposite the first direction.

4. The engine starting system of claim 3, wherein:

the exciter rotor windings have a phase shift in space and time.

5. The engine starting system of claim 4, wherein:

the amount of phase shift is a value within a range of about 80 electrical degrees to about 100 electrical degrees.

6. The engine starting system of claim 5, wherein the amount of phase shift is 90 electrical degrees.

7. The engine starting system of claim 6, wherein:

the main starter-generator rotor windings have a phase shift in space and time.

8. The engine starting system of claim 7, wherein:

the amount of phase shift is a value within a range of about 80 electrical degrees to about 100 electrical degrees.

9. The engine starting system of claim 7, wherein the amount of phase shift is 90 electrical degrees.

10. The engine starting system of claim 6, wherein the exciter controller receives a speed signal from a device that senses the speed of a shaft of the main starter-generator, wherein the device is selected from the group consisting permanent magnet starter-generator, a speed sensor, and the main stator windings.

11. The engine starting system of claim 1, further comprising:

a permanent magnet starter-generator mounted on a shaft of the main starter-generator and configured, upon rotation thereof, to provide a speed signal to an exciter controller, the speed signal being representative of the rotational speed of the shaft, wherein the exciter controller provides electrical excitation having a supply amplitude, a frequency, and a phase sequence based at least in part on the speed signal.

12. The engine starting system of claim 8, wherein the main starter-generator stator is supplied from an AC power source.

13. The engine starting system of claim 1, wherein at least one of the exciter rotor windings and the main starter-generator rotor windings are wound around salient poles.

14. The engine starting system of claim 1, wherein at least one of the exciter rotor windings and the main starter-generator rotor windings are wound on a cylindrical core.

15. An engine starting system, comprising: a shaft, wherein sufficient rotation of the shaft starts the engine;

a main starter-generator stator with a plurality of main stator windings wound thereon;

a main starter-generator rotor mounted on the shaft and disposed at least partially within the main starter-generator stator, the main starter-generator rotor having a plurality of main starter-generator rotor windings wound thereon to generate an air gap flux when they are electrically excited;

an exciter rotor mounted on the shaft, the exciter rotor having a plurality of exciter rotor windings wound thereon;

an exciter stator surrounding at least a portion of the exciter rotor, the exciter stator having a plurality of exciter stator windings wound thereon; and an exciter controller electrically coupled to the exciter stator windings, the exciter controller configured to provide electrical excitation to the exciter stator windings; and wherein the main starter-generator rotor windings receive a two-phase alternating current;

the exciter rotor windings electrically connected to the main starter-generator rotor windings and configured, upon electrical excitation thereof, to supply the two-phase electrical excitation to the main starter-generator rotor windings; and the exciter stator windings configured, upon electrical excitation thereof, to electrically excite the exciter rotor windings.

16. The engine starting system of claim 15, wherein:

interaction between current in the main starter-generator stator and the air gap flux creates a starting torque to turn the shaft to start the engine; and voltage supplied to the exciter stator winding controls the current in the main starter-generator rotor and the starting torque.

17. The engine starting system of claim 15, further comprising:

a permanent magnet generator mounted on the shaft and configured, upon rotation thereof, to supply a signal to the exciter controller that is representative of the rotational speed of the shaft, wherein the exciter controller determines the rotational speed of the shaft based at least in part on the signal supplied from the permanent magnet generator.

18. An aircraft starter-generator system to start an aircraft gas turbine engine as the prime mover, the system comprising:

a housing;

a drive shaft rotationally mounted within the housing and transmitting power to the prime mover;

a main starter-generator stator mounted within the housing and having a plurality of main starter-generator stator windings wound thereon;

a main starter-generator rotor mounted on the drive shaft and disposed within the main starter-generator stator, the main starter-generator rotor having a plurality of main starter-generator rotor windings wound thereon configured to receive a two-phase excitation current, wherein the main starter-generator rotor windings generate an air gap flux upon electrical excitation thereof;

an exciter rotor mounted on the drive shaft, the exciter rotor having a plurality of exciter rotor windings wound thereon, the exciter rotor windings electrically connected to the main starter-generator rotor;

an exciter stator surrounding the exciter rotor, the exciter stator having a plurality of exciter stator windings wound thereon, the exciter stator windings configured, upon electrical excitation thereof, to electrically excite the exciter rotor windings, wherein interaction between current in the main starter-generator stator and the air gap flux creates a starting torque to turn the shaft to start the engine, and voltage supplied to the exciter stator winding controls the current in the main starter-generator rotor and the starting torque.

19. The aircraft starter-generator system according to claim 18, wherein, after the aircraft gas turbine engine is started, the starter-generator system may act as a generator to generate relatively constant frequency AC power by independently controlling the rotational speed of the air gap flux.

* * * * *